(12) United States Patent
Rybalko et al.

(10) Patent No.: US 10,981,659 B2
(45) Date of Patent: **\*Apr. 20, 2021**

(54) PROPULSION SYSTEM USING LARGE SCALE VORTEX GENERATORS FOR FLOW REDISTRIBUTION AND SUPERSONIC AIRCRAFT EQUIPPED WITH THE PROPULSION SYSTEM

(71) Applicant: Gulfstream Aerospace Corporation, Savannah, GA (US)

(72) Inventors: Michael Rybalko, Savannah, GA (US); Timothy R. Conners, Tucson, AZ (US); Thomas R. Wayman, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 653 days.

This patent is subject to a terminal disclaimer.

(21) Appl. No.: 15/863,306

(22) Filed: Jan. 5, 2018

(65) Prior Publication Data

US 2018/0127106 A1 May 10, 2018

Related U.S. Application Data

(63) Continuation of application No. 14/172,560, filed on Feb. 4, 2014, now Pat. No. 9,884,688.

(Continued)

(51) Int. Cl.
*B64D 29/00* (2006.01)
*B64D 27/00* (2006.01)
(Continued)

(52) U.S. Cl.
CPC ............ *B64D 29/00* (2013.01); *B64D 27/00* (2013.01); *B64D 33/02* (2013.01); *F02K 3/025* (2013.01);
(Continued)

(58) Field of Classification Search
CPC ........... F02K 7/10; B64D 29/00; B64D 33/02; B64D 2033/0226; B64D 2033/026
See application file for complete search history.

(56) References Cited

U.S. PATENT DOCUMENTS

| 4,007,891 A | 2/1977 | Sorensen et al. |
| 4,919,364 A * | 4/1990 | John ........................ F02K 7/16 244/55 |

(Continued)

FOREIGN PATENT DOCUMENTS

| CN | 101421156 A | 4/2009 |
| CN | 101813554 A | 8/2010 |

OTHER PUBLICATIONS

B. J. Wendt, "The Performance of a Subsonic Diffuser Designed for High Speed Turbojet-Propelled Flight," NASA, Dec. 2004, NASA/CR-2004-213410.

(Continued)

*Primary Examiner* — Philip J Bonzell
*Assistant Examiner* — Michael B. Kreiner
(74) *Attorney, Agent, or Firm* — LKGlobal | Lorenz & Kopf, LLP

(57) ABSTRACT

An arrangement for use with a propulsion system for a supersonic aircraft includes a center body configured for coupling to an inlet and to support a boundary layer formed when the supersonic aircraft is flown at a predetermined altitude supersonic speed. The arrangement further includes a first vortex generator disposed on the center body. The first vortex generator extends a first height above the center body. The arrangement still further includes a second vortex generator disposed on the center body. The second vortex generator extends a second height above the center body, the second height being greater than the first height. The first height and the second height are greater than approximately seventy-five percent of a thickness of the boundary layer (Continued)

proximate a location of the first vortex generator and the second vortex generator, respectively, when the aircraft if flown at the predetermined altitude and the predetermined speed.

20 Claims, 9 Drawing Sheets

Related U.S. Application Data

(60) Provisional application No. 61/764,658, filed on Feb. 14, 2013.

(51) Int. Cl.
| | |
|---|---|
| *B64D 33/02* | (2006.01) |
| *F02K 7/10* | (2006.01) |
| *F02K 3/02* | (2006.01) |
| *B64C 30/00* | (2006.01) |
| *B64D 27/02* | (2006.01) |

(52) U.S. Cl.
CPC ............... *F02K 7/10* (2013.01); *B64C 30/00* (2013.01); *B64D 27/02* (2013.01); *B64D 2033/026* (2013.01); *B64D 2033/0226* (2013.01); *F05D 2210/33* (2013.01); *F05D 2220/10* (2013.01); *Y02T 50/60* (2013.01)

(56) References Cited

U.S. PATENT DOCUMENTS

| | | | | |
|---|---|---|---|---|
| 5,058,837 | A | | 10/1991 | Wheeler |
| 5,156,362 | A | | 10/1992 | Leon |
| 5,301,901 | A | * | 4/1994 | Kutschenreuter, Jr. ...................... B64D 33/02 137/15.1 |
| 5,598,990 | A | | 2/1997 | Farokhi et al. |
| 6,003,302 | A | * | 12/1999 | Feldman .................... F02K 7/10 244/53 B |
| 6,655,632 | B1 | | 12/2003 | Gupta et al. |
| 7,967,241 | B2 | | 6/2011 | Chase et al. |
| 8,186,942 | B2 | * | 5/2012 | Haas ....................... B64D 33/02 415/145 |
| 8,210,482 | B2 | * | 7/2012 | Miller ..................... B64C 23/06 244/200.1 |
| 8,240,616 | B2 | * | 8/2012 | Miller ..................... B64C 21/04 244/204 |
| 8,393,158 | B2 | * | 3/2013 | Conners .................. F02C 7/042 60/767 |
| 8,403,271 | B2 | * | 3/2013 | Domel .................... B64C 30/00 244/200 |
| 8,528,601 | B2 | * | 9/2013 | Dahm ..................... B64C 21/10 137/809 |
| 8,656,957 | B2 | * | 2/2014 | Babinsky .................. F15C 1/16 137/809 |
| 9,429,071 | B2 | * | 8/2016 | Quackenbush ............ F02C 7/04 |
| 9,884,688 | B2 | * | 2/2018 | Rybalko .................... F02K 7/10 |
| 2006/0060722 | A1 | | 3/2006 | Choi |
| 2009/0014597 | A1 | | 1/2009 | Chase et al. |
| 2009/0107557 | A1 | | 4/2009 | Conners |
| 2009/0155067 | A1 | | 6/2009 | Haas |
| 2010/0288379 | A1 | | 11/2010 | Dahm |
| 2012/0018021 | A1 | | 1/2012 | Babinsky et al. |
| 2013/0037657 | A1 | * | 2/2013 | Breidenthal .......... F03D 1/0633 244/204.1 |

OTHER PUBLICATIONS

Thomas Herges, et al. Micro-Ramp Flow Control of Normal Shock/Boundary-Layer Interactions, AIAA Journal, Nov. 2010 pp. 2529-2542, vol. 48, No. 11, American Institute of Aeronautics and Astronautics, Inc.

Thomas Herges, et al. Micro-Ramp Flow Control of Normal Shock/Boundary-Layer Interactions, 47th AIAA Aerospace Sciences Meeting Including the New Horizons Forum and Aerospace Exposition, Jan. 5-8, 2009, American Institute of Aeronautics and Astronautics, Orlando, Florida.

Michael Rybalko, et al., Micro-Ramps for External Compression Low-Boom Inlets, AIAA Fluid Dynamics Conference, Jun. 22-25, 2009, AIAA-2009-4206, National Aeronautics and Space Administration, Glenn Research Center, Cleveland, Ohio.

Michael Rybalko, et al., Micro-Ramps for External Compression Low-Boom Inlets, 39th Annual AIAA Fluid Dynamics Conference, Jun. 22-25, 2009, AIAA-2009-4206, American Institute of Aeronautics, Inc.

Tyler Gillen, et al., Vortex Generators for Diffuser of Axisymmetric Supersonic Inlets, 5th Flow Control Conference, Jun. 28-Jul. 1, 2010, AIAA 2010-4253, American Institute of Aeronautics and Astronautics, Inc.

Thomas G. Herges, et al., Surface Flow and PSP Measurements in the Large-Scale Low-Boom Inlet, 29th AIAA Applied Aerodynamics Conference, Jun. 27-30, 2011, Honolulu, Hawaii, AIAA 2011-3799, American Institute of Aeronautics and Astronautics, Inc.

Tyler Gillen, et al., Vortex Generators for for Dual-Stream Low-Boom Inlet, 29th AIAA Applied Aerodynamics Conference, Jun. 27-30, 2011, Honolulu, Hawaii, AIAA 2011-3802, American Institute of Aeronautics and Astronautics, Inc.

Michael Rybalko, et al., Vortex Generators for for Single-Stream Low-Boom Inlet, 29th AIAA Applied Aerodynamics Conference, Jun. 27-30, 2011, Honolulu, Hawaii, AIAA 2011-3803, American Institute of Aeronautics and Astronautics, Inc.

Tyler Gillen, et al., Vortex Generators for for Axisymmetric Dual-Stream Supersonic Inlet, 47th AIAA/ASME/SAE/ASEE Joint Propulsion Conference & Exhibit, Jul. 31-Aug. 3, 2011, San Diego, California, AIAA 2011-5567, American Institute of Aeronautics and Astronautics, Inc.

Manan Vyas et al., "Experimental Investigation of Vortex Generators on a Low-Boom Supersonic Inlet (Invited)", American Institute of Aeronautics and Astronautics. AIAA Conference Papers, Jun. 30, 2011 (Jun. 30, 2011), XP055298451, Reston DOI: 10.2514/6.2011-3796.

Wikipedia, "Boundary Layer Thickness", https://en.wikipedia.org/wiki/Boundary_layer_thickness, accessed Mar. 2, 2017.

Barnes W. Mccormick. Aerodynamics, Aeronautics, and Flight Mechanics. New York: John Wiley & Sons, 1979.

Conners, Timothy R., and Thomas R. Wayman. "The Feasibility of a High-Flow Nacelle Bypass for Low Sonic Boom Propulsion System Design." AIAA 29th Applied Aerodynamics Meeting. 2011. AIAA-2011-3739.

Hirt, Stefanie M., et al. "Experimental Investigation of a Large-Scale Low-Boom Inlet Concept." AIAA paper 3796 (2011): 2011.

* cited by examiner

PROPULSION SYSTEM USING LARGE SCALE VORTEX GENERATORS FOR FLOW REDISTRIBUTION AND SUPERSONIC AIRCRAFT EQUIPPED WITH THE PROPULSION SYSTEM

CROSS-REFERENCE TO RELATED APPLICATION

This application is a continuation of U.S. application Ser. No. 14/172,560 filed Feb. 4, 2014, and entitled "Propulsion System Using Large Scale Vortex Generators for Flow Redistribution and Supersonic Aircraft Equipped with the Propulsion System" which claims the benefit of U.S. Provisional Application No. 61/764,658 filed Feb. 14, 2013, and entitled "Large-Scale Flow Redistribution Using Vortex Generators", both of which are incorporated herein by reference in their entirety.

TECHNICAL FIELD

The present invention generally relates to aviation and more particularly relates to a propulsion system for a supersonic aircraft.

BACKGROUND

The engine of a conventional supersonic aircraft includes a center body having an elongated compression surface to help improve pressure recovery caused by movement of the engine through the air at supersonic speeds. The compression surface, together with other features of the aircraft's propulsion system, slows the supersonic airflow entering the propulsion system to a speed that is compatible with the turbo machinery of the engine.

One undesirable consequence of having an elongated compression surface is the buildup of a relatively thick boundary layer on internal surfaces of the inlet (e.g., portions of the diffuser). The boundary layer is a portion of the airflow located proximate a viscous surface (such as the compression surface and the surface of the diffuser) that, because of its interaction with the viscous body, moves slower than the free stream velocity.

Because the boundary layer air is moving at a slower speed than the remainder of the airflow, the boundary layer air will have a lower stagnation pressure than the remainder of the airflow. This leads to distortion in the stagnation pressure of the airflow entering the Aerodynamic Interaction Plane ("AIP") (e.g., the fan or the face of the engine). This distortion in stagnation pressure is undesirable, because it may adversely impact both engine operability and performance.

Several different solutions have been developed to combat the distortion in the stagnation pressure caused by the elongated compression surface. For example, some propulsion systems bleed the boundary layer from the airflow by passing the airflow over a porous surface and using low pressure to extract the boundary layer from the airflow. While this is effective at diminishing the thickness of the boundary layer, such bleed systems add cost, complexity, and weight to a propulsion system.

Another solution has been to position vortex generators of modest height on the center body. These vortex generators have a height ranging from twenty percent to forty percent of the local boundary layer thickness and generate vortices that propagate completely within the boundary layer. These vortices increase the energy level of the boundary layer which, in turn, allows the boundary layer to remain more robustly attached to the curving surface of the center body or other inlet surface. While this inhibits growth and separation of the boundary layer, it does not modify its structure or appreciably reduce its thickness and the stagnation pressure of the air entering the AIP remains distorted.

Accordingly, it is desirable to provide a propulsion system that reduces distortion of the stagnation pressure of the airflow entering the AIP. Additionally, it is desirable to provide a supersonic aircraft equipped with a propulsion system that reduces the distortion of the stagnation pressure. Furthermore, other desirable features and characteristics will become apparent from the subsequent summary and detailed description and the appended claims, taken in conjunction with the accompanying drawings and the foregoing technical field and background.

BRIEF SUMMARY

A propulsion system for a supersonic aircraft and an arrangement for use with a propulsion system for a supersonic aircraft are disclosed herein.

In a first non-limiting embodiment, the arrangement includes, but is not limited to, a center body configured for coupling to an inlet and to support a boundary layer formed when the supersonic aircraft is flown at a predetermined altitude and a predetermined speed greater than Mach 1. The arrangement further includes, but is not limited to, a first vortex generator disposed on the center body. The first vortex generator extends a first height above the center body. The arrangement still further includes, but is not limited to, a second vortex generator disposed on the center body. The second vortex generator extends a second height above the center body, the second height being greater than the first height. The first height and the second height are greater than approximately seventy-five percent of a thickness of the boundary layer proximate a location of the first vortex generator and the second vortex generator, respectively, when the aircraft if flown at the predetermined altitude and the predetermined speed.

In another non-limiting embodiment, the propulsion system includes, but is not limited to, a plurality of vortex generators positioned upstream of an engine of the propulsion system. Each vortex generator of the plurality of vortex generators has a height such that when the supersonic aircraft is flown at a predetermined altitude and at a predetermined cruise speed, the predetermined cruise speed being greater than Mach 1, the plurality of vortex generators create a plurality of vortices that propagate at least partially outside of a boundary layer formed proximate a surface of a supersonic inlet. The plurality of vortices causes a high-velocity portion of the airflow to move towards the engine core and a low-velocity portion of the airflow to move towards the engine bypass prior to the airflow reaching a face of the engine. The plurality of vortex generators are disposed aft of a terminal shock formed when the supersonic aircraft is flown at the predetermined cruise speed. Each vortex generator of the plurality of vortex generators has a height greater than a thickness of the boundary layer at the location of each vortex generator of the plurality of vortex generators.

In another non-limiting embodiment, the propulsion system includes, but is not limited to, a plurality of vortex generators positioned upstream of an engine of the propulsion system. Each vortex generator of the plurality of vortex generators has a height such that when the supersonic aircraft is flown at a predetermined altitude and at a predetermined cruise speed, the predetermined cruise speed being greater than Mach 1, the plurality of vortex generators create a plurality of vortices that propagate at least partially outside of a boundary layer formed proximate a surface of a supersonic inlet. The plurality of vortices causes a high-velocity portion of the airflow to move towards the surface and a low-velocity portion of the airflow to move away from the surface prior to the airflow reaching a face of the engine. The plurality of vortex generators are disposed aft of a terminal shock formed when the supersonic aircraft is flown at the predetermined cruise speed. Each vortex generator of the plurality of vortex generators have a height greater than a thickness of the boundary layer at the location of each vortex generator of the plurality of vortex generators.

BRIEF DESCRIPTION OF THE DRAWINGS

The present invention will hereinafter be described in conjunction with the following drawing figures, wherein like numerals denote like elements.

DETAILED DESCRIPTION

Figure 1:
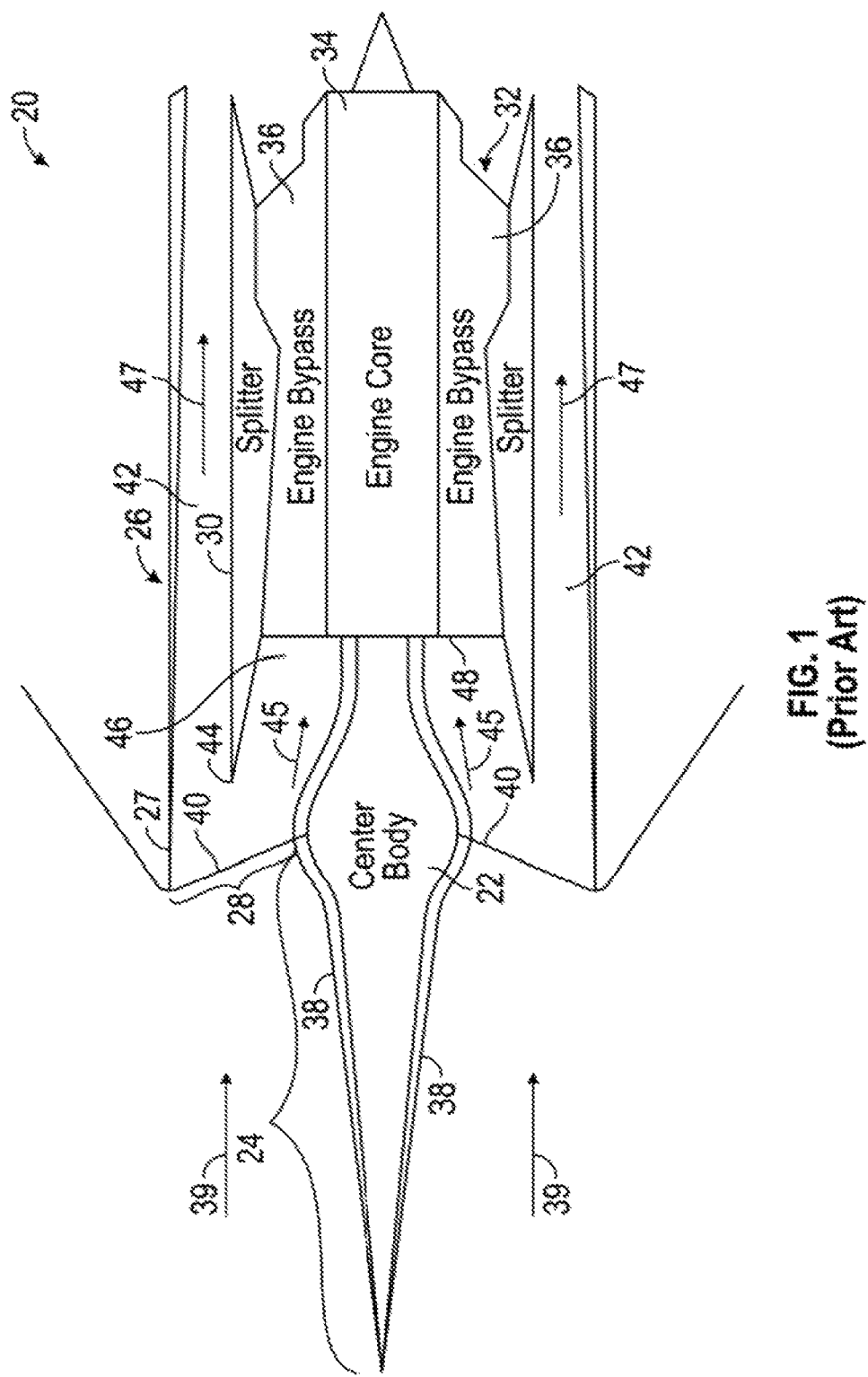
FIG. 1 is a schematic cross-sectional view illustrating a prior art propulsion system for use with a supersonic aircraft.

The following detailed description is merely exemplary in nature and is not intended to limit the invention or the application and uses of the invention. Furthermore, there is no intention to be bound by any theory presented in the preceding background or the following detailed description.

An improved propulsion system for a supersonic aircraft and a supersonic aircraft equipped with the propulsion system are disclosed herein. In an exemplary embodiment, the propulsion system of the present disclosure includes an engine, an inlet center body having an elongated compression surface, a shroud that partially surrounds both the engine and the center body and a plurality of vortex generators. The shroud is configured to guide an airflow passing over the center body towards the engine where it is then ingested by the engine and may comprise a nacelle, a bypass splitter, or any other suitable structure.

The vortex generators of the present disclosure are relatively tall as compared with conventional vortex generators. While conventional vortex generators have a height that is only a small fraction of the thickness of the boundary layer that forms on the center body during supersonic flight at a predetermined speed (e.g., supersonic cruise), the vortex generators of the present disclosure have a height that approaches or exceeds the thickness of the boundary layer at the location where the boundary layer encounters the vortex generators. In an example, the vortex generators of the present disclosure have a height of at least seventy five percent of the thickness of the boundary layer that forms on the center body when the aircraft is flown at the predetermined speed. This extended height will allow the vortex generators to reach a region of the boundary layer where the air has a relatively high velocity as compared with lower regions of the boundary layer where the air's velocity can be quite low. In other examples, the vortex generators will have an even taller profile (e.g., having a height that is equal to, or greater than the thickness of the boundary layer at the location where the boundary layer encounters the vortex generator) and will therefore encounter portions of the airflow having even higher velocities.

By extending into a region of the airflow where the air is moving at a relatively high velocity, the vortex generators of the present disclosure are able to generate vortices that propagate outside of the boundary layer. This is a significant departure from conventional vortex generators which, because of their lower profiles, generate vortices that propagate entirely within the boundary layer. Conventionally, vortices that propagate solely within the boundary layer are desirable because they enable the boundary layer to remain more robustly attached to the center body and thereby counter the natural tendency of the boundary layer to thicken as it passes over curved surfaces.

In the present disclosure, however, the relatively tall vortex generators give rise to vortices that propagate outside of the boundary layer when the supersonic aircraft is flown at the predetermined speed. When arranged in pairs having opposite angles of incidence, the vortex generators are capable of producing local up-wash and downwash as a result of the interaction of adjacent counter-rotating vortices. The height of the vortex generators in the present invention increases the strength of this effect, due to the higher flow velocities encountered by the taller vortex generators. The vortex generators of the present disclosure are therefore able to move the higher speed air of the non-boundary layer portion of the airflow radially inward towards the center body and also move the lower speed air of the boundary layer radially outward and away from the center body. Whereas the goal of conventional vortex generators has been to keep the boundary layer attached to the center body, one of the goals of the vortex generators of the present disclosure is to cause the boundary layer to detach from the center body and to have that slower moving air move up into the remainder of the airflow where it can mix with the higher speed air. This mixing reduces the variation in stagnation pressure of the airflow in the radial direction and thereby presents the AIP (e.g., the engine face) with an airflow having less radial distortion than would otherwise result from the use of conventional vortex generators (or from the use of no vortex generators). By arranging the vortex generators circumferentially around the center body, or around the inner surface of the shroud, or both, the circumferential distortion of the stagnation pressure can also be reduced.

It is desirable to present an engine face with an airflow having a homogenous stagnation pressure rather than an airflow having radial distortion in stagnation pressure. Engines have sensitivities to distortion in the flow and by making the stagnation pressure across the entire flow more homogenous, the engine's overall performance may be improved. In addition, depending on the engine that is utilized in the propulsion system, there can also be an increase in engine thrust. For example, if the engine has an engine cycle wherein the core is more sensitive to changes in stagnation pressure than is the engine's fan and bypass, then by moving the slower moving air of the boundary layer away from the center body and by moving the faster moving air of the remainder of the airflow towards the center body, the core will be presented with an airflow having a higher velocity and hence a higher stagnation pressure. This, in turn, can enhance the amount of thrust the engine generates.

A greater understanding of the propulsion system described above and of the supersonic aircraft employing the propulsion system may be obtained through a review of the illustrations accompanying this application together with a review of the detailed description that follows.

FIG. 1 is a schematic cross-sectional view illustrating a prior art propulsion system 20. Prior art propulsion system 20 includes a center body 22 having an elongated compression surface 24, a nacelle 26 including a cowl 27, an inlet 28 formed by the separation between center body 22 and cowl 27, a splitter 30 and an engine 32 having an engine core 34 and an engine bypass 36.

A supersonic free stream of air 39 approaching propulsion system 20 will initially encounter elongated compression surface 24. Elongated compression surface 24 will cause supersonic free stream of air 39 to change direction and follow the contours of the compression surface. This interaction decelerates supersonic free stream air 39 and causes a boundary layer 38 to form on center body 22. Boundary layer 38 is a region of stagnant and slower moving air whose thickness increases the further it travels along center body 22.

As supersonic free stream of air 39 reaches inlet 28, it passes through a terminal shock 40 extending from cowl 27 to center body 22. Passage through terminal shock 40 decelerates the airflow to subsonic speeds which are more compatible with engine 32. Further slowing may be required and if so, will occur downstream of terminal shock 40.

As the airflow continues aft of inlet 28, a leading edge 44 of splitter 30 divides the airflow into a primary airflow 45 and a secondary airflow 47. Primary airflow 45 is guided or routed by splitter 30 towards engine 32 while secondary airflow 47 moves through a bypass channel 42 that avoids engine 32 altogether.

As primary airflow 45 moves downstream past a leading edge 44 of splitter 30, it enters a diffuser region 46. In diffuser region 46, center body 22 narrows, creating a larger volume of space for primary airflow 45 to move through. This narrowing of center body 22 causes boundary layer 38 to thicken as it attempts to remain entrained to the surface of center body 22.

When primary airflow 45 arrives at face 48 of engine 32, boundary layer 38 is at its thickest condition. The portion of primary airflow 45 that is outside of boundary layer 38 is moving at a high velocity and therefore has a high stagnation pressure. The portion of primary airflow 45 within boundary layer 38 has a lower velocity and a correspondingly lower stagnation pressure. Accordingly, prior art propulsion system 20 yields substantial radial distortion of the airflow reaching face 48.

Engine core 34 includes the primary powered components of engine 32. For example, engine core 34 may comprise a turbine, a combustor, and a compressor, among other components. For ease of illustrations, these engine components are not illustrated. Engine fan bypass 36 is a region that is largely devoid of any powered components. Rather, this is a region where the engine's fan pushes air around the outside of engine core 34. As illustrated in FIG. 1, boundary layer 38 comprises a substantial portion of the airflow that enters engine core 34. Accordingly, a substantial portion of the air that enters engine core 34 has a stagnation pressure that is lower than the remainder of primary airflow 45. In the illustrated embodiment, engine core 34 has a higher sensitivity to changes in stagnation pressure than engine fan bypass 36. In other words, an increase in the stagnation pressure of the airflow entering engine core 34 would yield a relatively large increase in thrust whereas a corresponding increase in the stagnation pressure of the airflow entering engine fan bypass 36 would yield a smaller increase in thrust and, conversely a reduction in the stagnation pressure entering engine fan bypass 36 would result in a correspondingly small decrease in net thrust.

Accordingly, it would be desirable to direct the higher velocity air of primary airflow 45 towards the engine core and to direct the lower velocity air of primary flow 45 (i.e., the air in boundary layer 38) away from the engine core.

Figure 2:
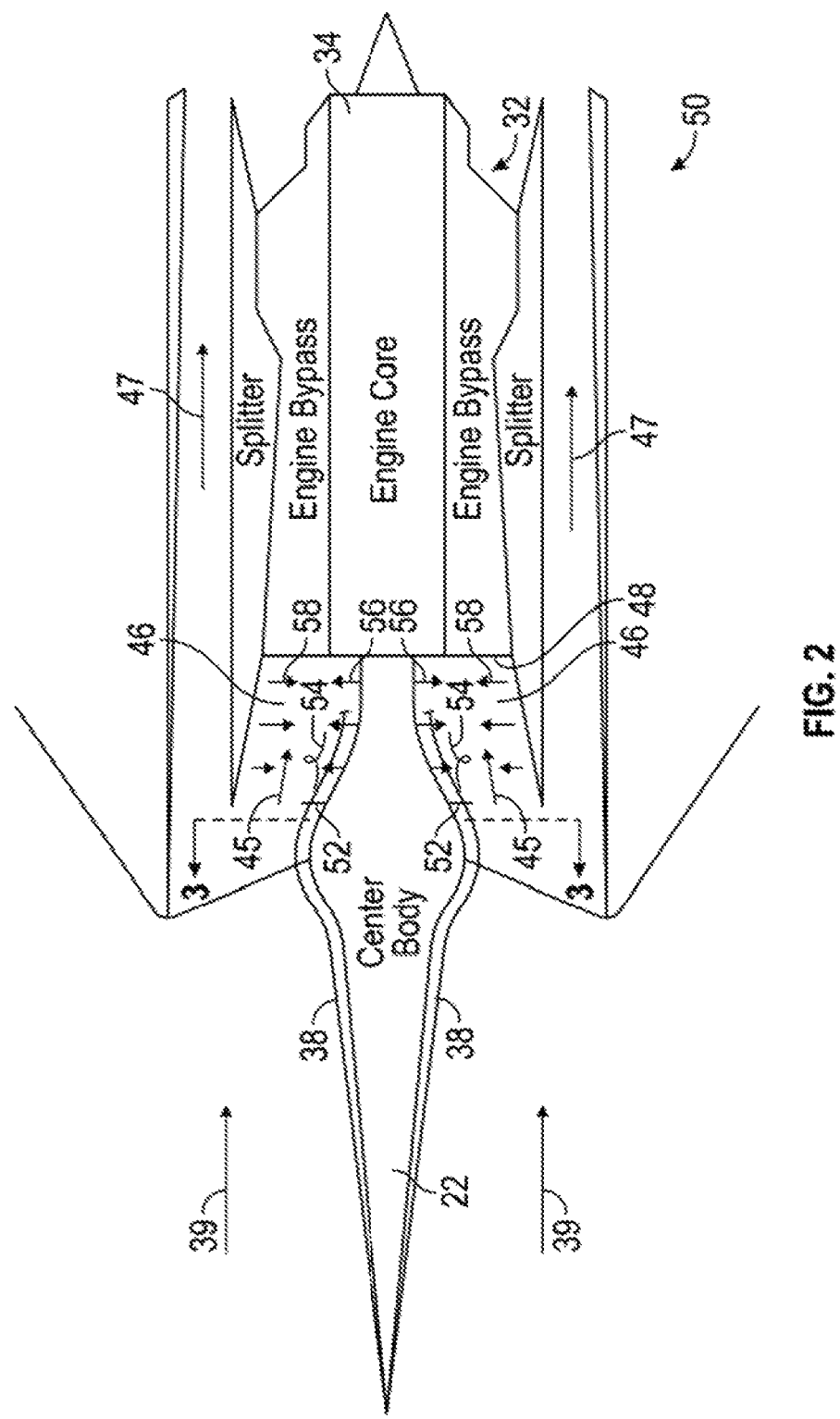
FIG. 2 is a schematic cross-sectional view illustrating a non-limiting embodiment of a propulsion system made in accordance with the teachings of the present disclosure.

FIG. 2 is a schematic cross sectional view of a propulsion system 50 made in accordance with the teachings of the present disclosure. With continuing reference to FIG. 1, propulsion system 50 is substantially identical to prior art propulsion system 20 with the primary exception being that propulsion system 50 includes a plurality of vortex generators 52 disposed circumferentially about center body 22. It should be understood that FIG. 2 presents a schematic representation and, accordingly, the depiction of each vortex generator has been simplified for ease of illustration.

In the illustrated embodiment, each vortex generator of the plurality of vortex generators has a height that exceeds the thickness of boundary layer 38 at the locations where plurality of vortex generators 52 encounter boundary layer 38. Consequently, each vortex generator of plurality of vortex generators 52 will encounter the high velocity air of primary airflow 45 and will generate a plurality of vortices 54, with alternating sense of direction, that will propagate downstream in diffuser region 46. Depending on the height of plurality of vortex generators 54, plurality of vortices 54 may propagate through both the high velocity air and the slower moving air of boundary layer 38, or they may propagate only through the high velocity air. If the VGs are of sub-boundary layer height or are equal to boundary layer height, then plurality of vortices 54 will propagate through both boundary layer 38 and through the high velocity air outside of boundary layer 38. If the vortices are created outside of boundary layer 38, then they will remain there.

As plurality of counter-rotating vortices 54 propagate, they will generate up-wash 56 and downwash 58 that will move the high velocity air of primary airflow 45 radially towards center body 22 and that will also move the low velocity air of primary airflow 45 (i.e., the air in boundary layer 38) radially away from center body 22. This radial movement of the high and low velocity air of primary airflow 45 will cause the high velocity air and the low velocity air to mix and intermingle. This causes an exchange of energy between the different portions of primary airflow 45 (higher velocity portion and lower velocity portion) that yields an airflow having a more homogenous velocity throughout primary airflow 45. This, in turn, reduces the disparity of the stagnation pressure at different radial locations throughout primary airflow 45 and therefore lowers the overall radial distortion of primary airflow 45 before it reaches face 48 of engine 32. Thus, as a result of the agitation of primary airflow 45 by plurality of vortex generators 52, the stagnation pressure of the portion of primary airflow 45 entering engine core 34 will be higher than it would have been had plurality of vortex generators 52 not been present.

Figure 3:
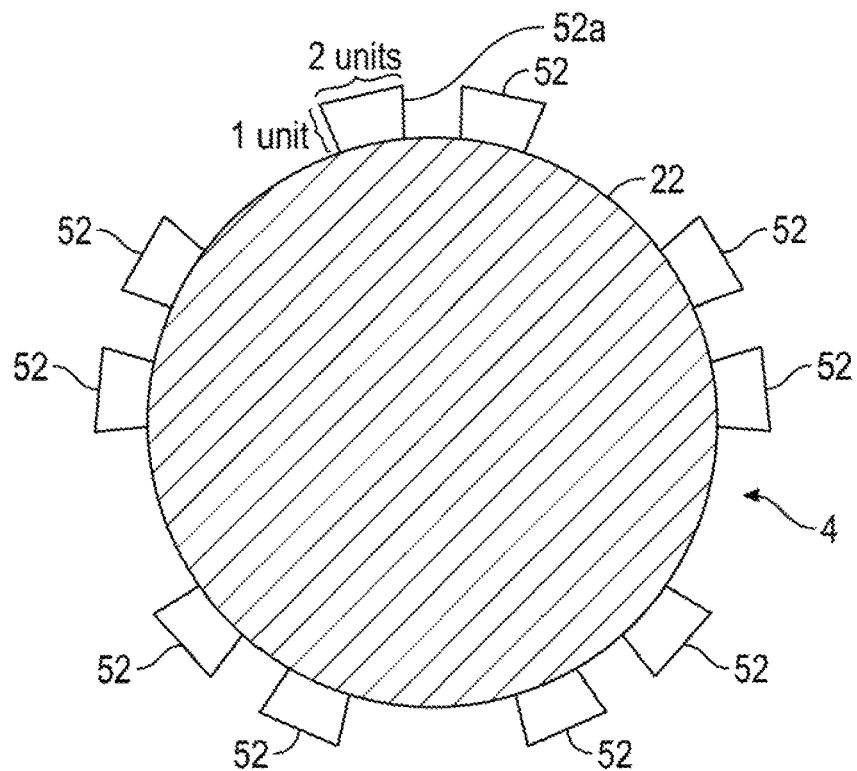
FIG. 3 is a cross-sectional view taken across the line 3-3 of FIG. 2.
Figure 4:
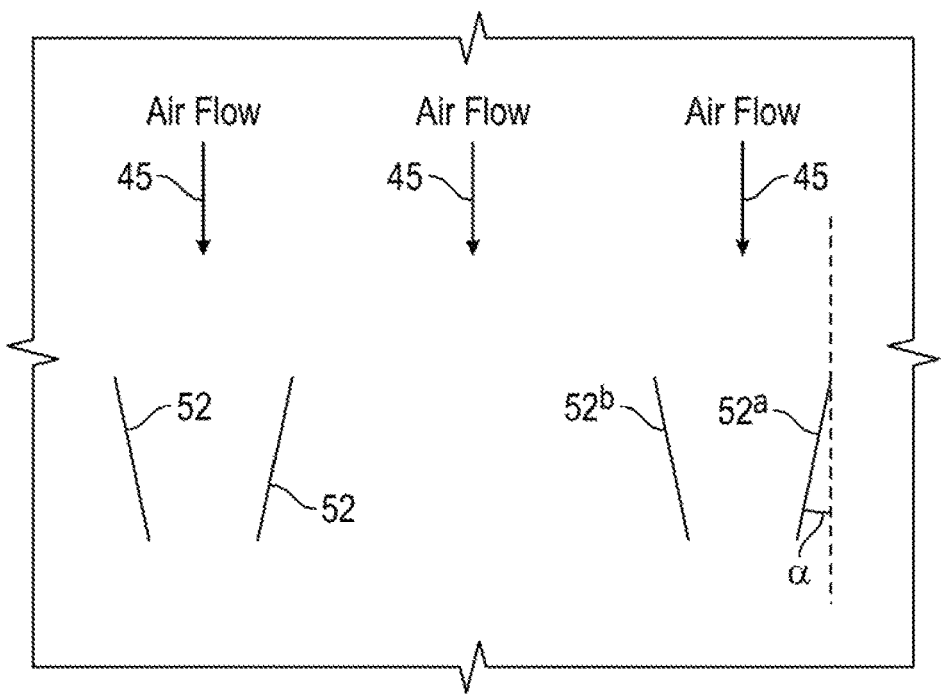
FIG. 4 is a fragmentary schematic view illustrating a portion of the propulsion system of FIG. 2 from the perspective of arrow 4 of FIG. 3.

FIG. 3 is a cross-sectional view taken along the line 3-3 of FIG. 2. Plurality of vortex generators 52 are arranged circumferentially about center body 22 in pairs. With continuing reference to FIGS. 1-2, and as discussed in greater detail below, each pair of vortex generators is oriented at a predetermined angle of attack with respect to primary airflow 45. In some embodiments, each pair of vortex generators may be positioned and aligned at substantially the same axial location along center body 22. In other embodiments, the axial position of each pair of vortex generators along center body 22 may be varied. In the illustrated embodiment, each vortex generator 52 of each pair of vortex generators has a rectangular configuration. Further, as illustrated by vortex generator 52a, each vortex generator 52 has an aspect ratio of 2. It should be understood that this is merely exemplary in nature, in other embodiments, plurality of vortex generators 52 may have any suitable shape, contour, aspect ratio, or configuration without departing from the teachings of the present disclosure.

With continuing reference to FIGS. 1-3, FIG. 4 is a fragmentary schematic view illustrating a section of center body 22 viewed from the perspective of arrow 4 of FIG. 3. In this illustration, two pairs of vortex generators 52 are depicted. Each vortex generator 52 is oriented at an angle of attack $\alpha$. In various embodiments, angle of attack $\alpha$ may vary from sixteen degrees to twenty four degrees. In other embodiments, angle of attack $\alpha$ may have any suitable magnitude. In the illustrated embodiment, each vortex generator 52 of each pair of vortex generators is canted at an equal and opposite angle. For example, vortex generator 52a is canted at an angle of attack $\alpha$ of positive 16 degrees and vortex generator 52b is canted at an angle of attack $\alpha$ of negative 16 degrees. In other embodiments, the angles of attack $\alpha$ of each vortex generator 52 of each pair may not be equal. In still other embodiments, the angles of attack $\alpha$ of each vortex generator 52 of each pair may not be opposite (i.e., they may both be negative or they may both be positive).

In the illustrated embodiment, each vortex generator 52 of each pair of vortex generators is arranged such that their respective downstream sides (from the perspective of primary airflow 45) are closer together than their respective upstream sides. Thus, as air from primary airflow 45 passes between the two vortex generators 52 of each pair of vortex generators, the vortices generated by each pair of vortex generators create an up-wash that will move slower moving air from boundary layer 38 into the faster moving air of primary airflow 45. Similarly, as air from primary airflow 45 passes between each pair of vortex generators, vortices are generated that create a downwash that will move the faster moving air from primary airflow 45 down towards center body 22. The combination of the up-wash and the downwash cooperate to break up the boundary layer, and mix, redistribute, and generally homogenize the flow. This creates a more consistent stagnation pressure throughout primary airflow 45.

Figure 5:
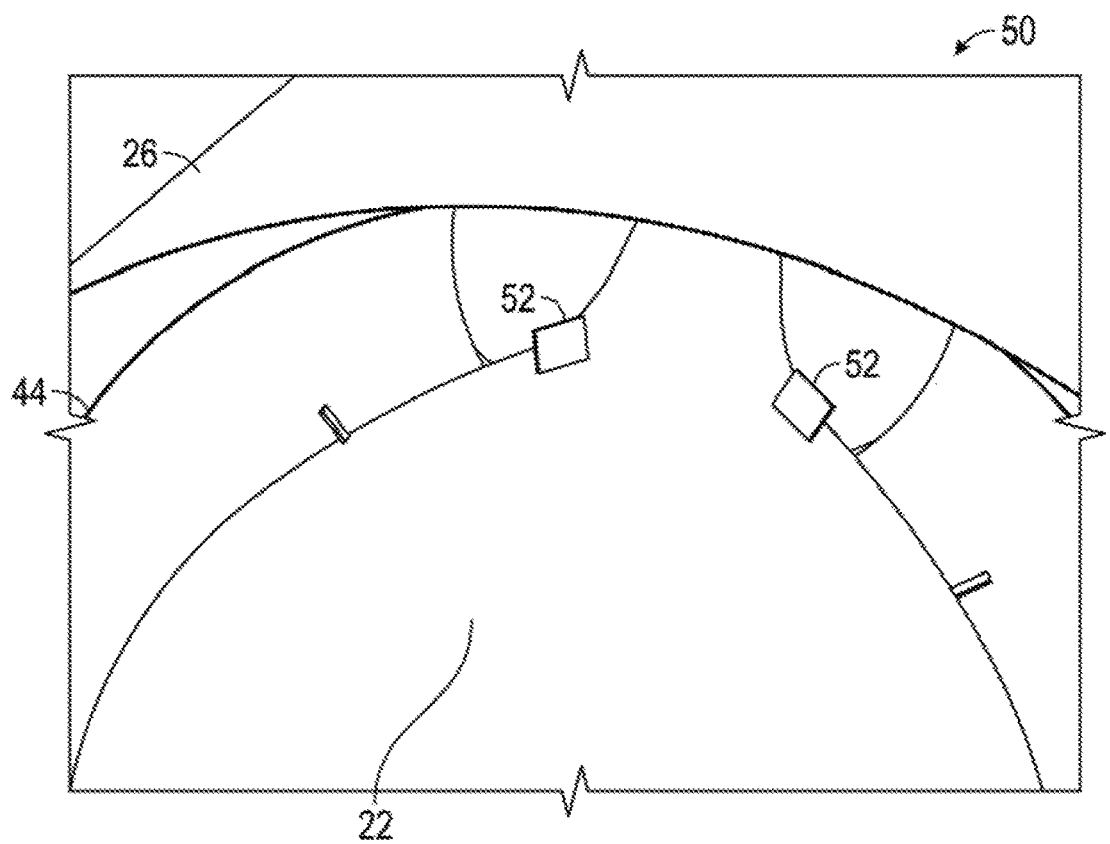
FIG. 5 is a fragmentary perspective view illustrating a first non-limiting arrangement of a plurality of vortex generators included with the propulsion system of FIG. 2.
Figure 6:
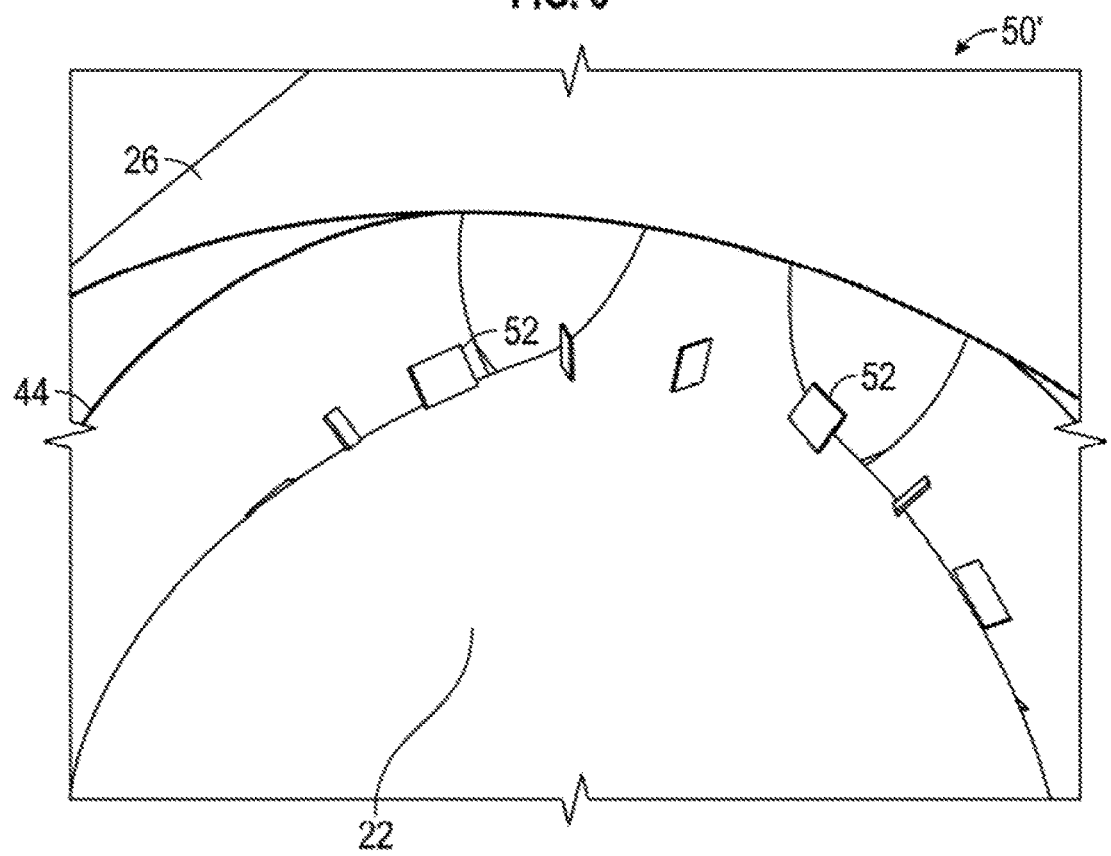
FIG. 6 is a fragmentary perspective view illustrating a second non-limiting arrangement of a plurality of vortex generators included with the propulsion system of FIG. 2.

FIG. 5 is a perspective view illustrating a portion of propulsion system 50, viewed while looking in a downstream direction. In the illustrated embodiment, the vortex generators of each pair of vortex generators, and each pair of vortex generators themselves are spaced apart at a relatively wide gap. FIG. 6 is a perspective view illustrating a portion of a propulsion system 50', viewed while looking in a downstream direction. Propulsion system 50' is substantially identical to propulsion system 50, the only difference being that the vortex generators of each pair of vortex generators and each pair of vortex generators themselves are spaced apart at a relatively narrow gap. The spacing between vortex generators and the spacing between each pair of vortex generators can be varied as needed for each application.

Figure 7:
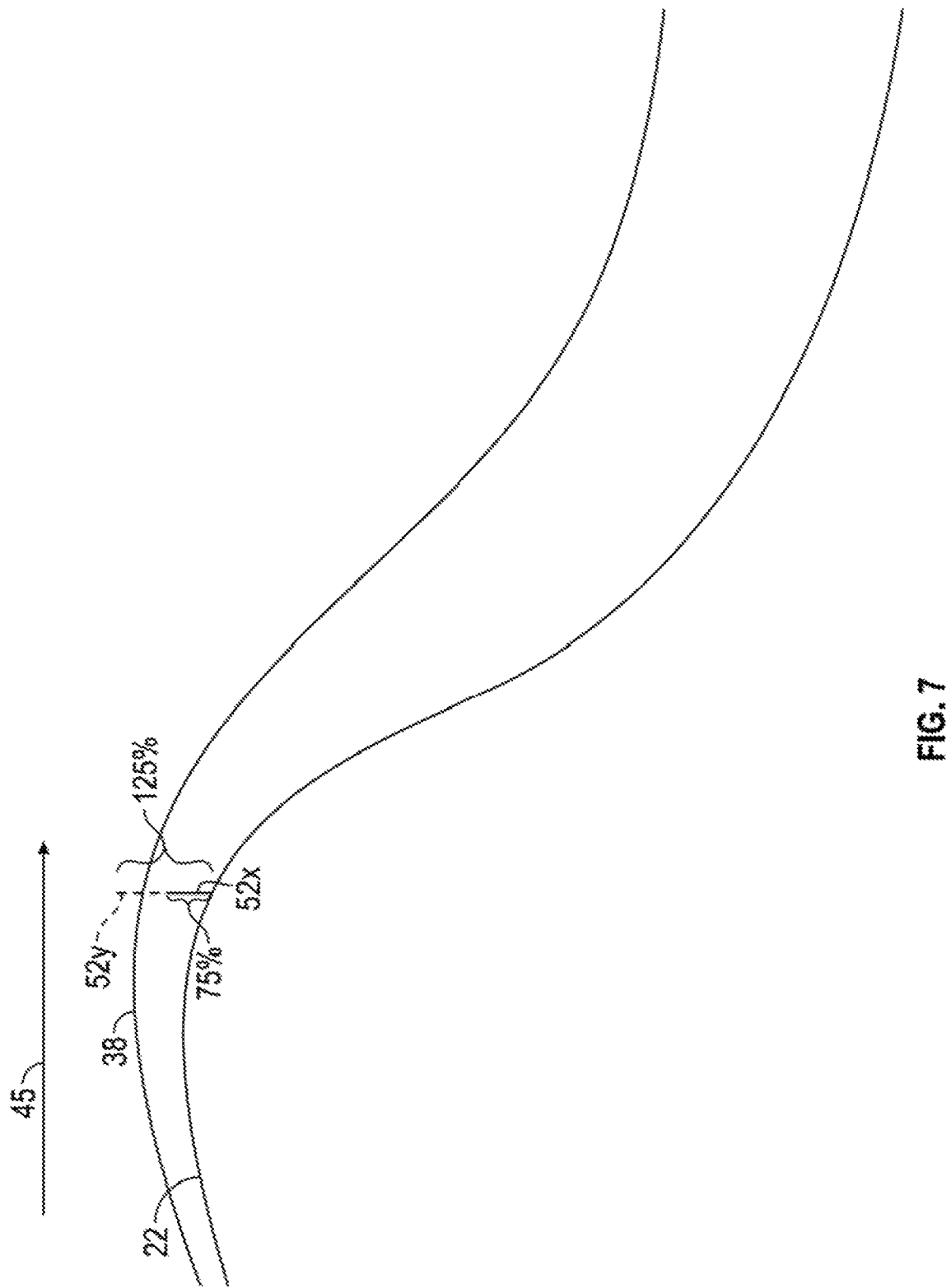
FIG. 7 is an expanded schematic side view illustrating a portion of the propulsion system of FIG. 2.

With continuing reference to FIGS. 1-6, FIG. 7 is an expanded schematic side view illustrating a portion of center body 22 with boundary layer 38 flowing over the surface of center body 22. Also illustrated are two vortex generators, a vortex generator 52x and a vortex generator 52y, which may be utilized with propulsion system 50. Vortex generator 52x and 52y each have different heights. Vortex generator 52x has a height that is approximately seventy five percent of the local thickness of boundary layer 38 while vortex generator 52y has a height that is approximately one hundred and twenty five percent of the local thickness of boundary layer 38. Vortex generators having a height of seventy five percent of the local thickness of the boundary layer will reach into the upper reaches of the boundary layer where the air is flowing at a relatively fast rate as compared with the remainder of the boundary layer. Vortex generators having a height of anything over one hundred percent of the local boundary layer thickness will protrude beyond the boundary layer and will encounter the fast moving portions of primary airflow 45. Accordingly, FIG. 7 illustrates the lower and upper limits a preferred range of vortex generator heights, although it should be understood that the use of vortex generators having greater or lesser heights may also be employed without departing from the teachings of the present disclosure, so long as the vortex generators cause the generation of vortices that propagate at least partially outside of the boundary layer and cause the mixing and intermingling of high and low velocity air, as discussed above.

Figure 8:
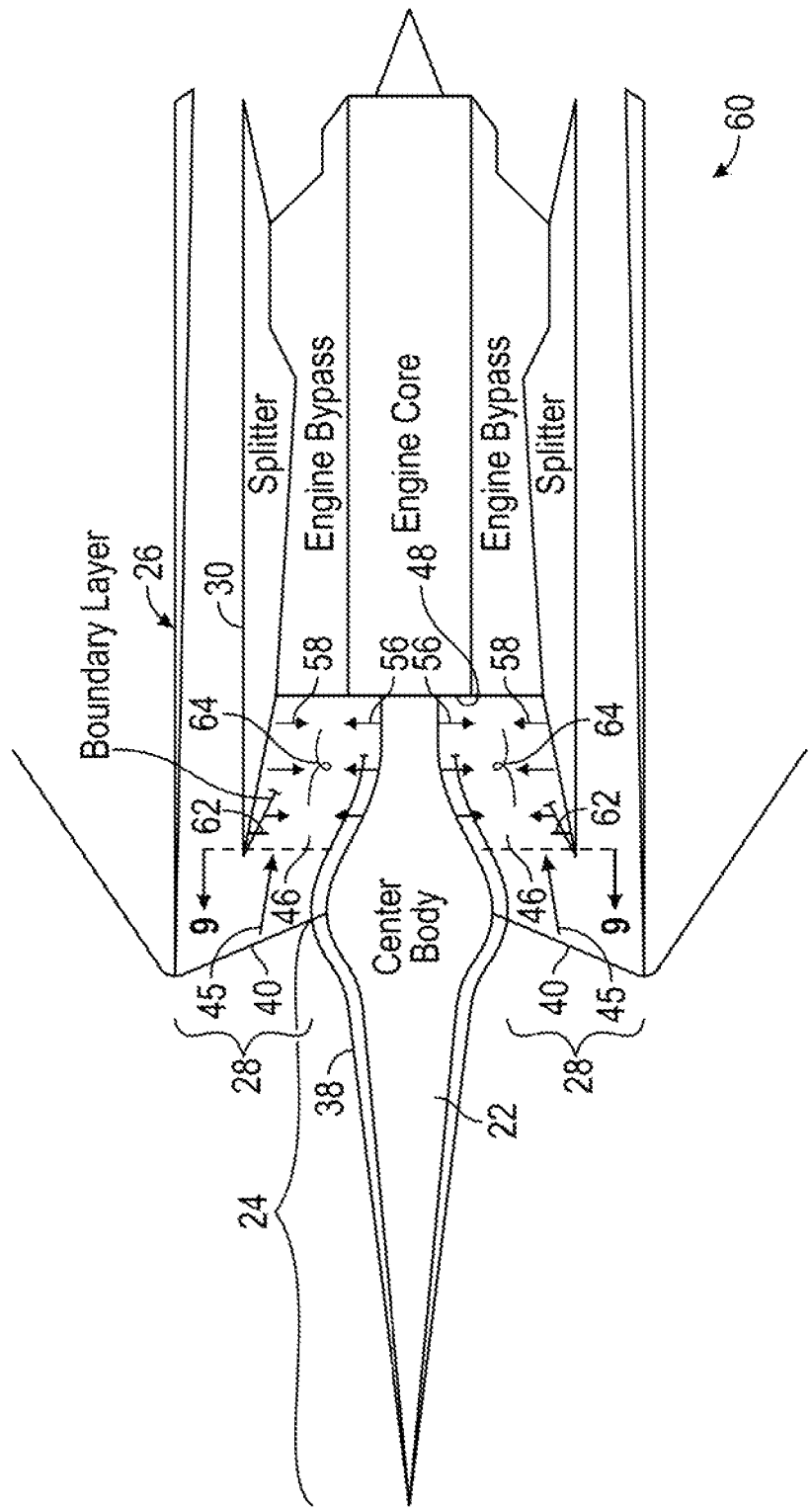
FIG. 8 is a schematic cross-sectional view illustrating another non-limiting embodiment of a propulsion system made in accordance with the teachings of the present disclosure.

FIG. 8 is a schematic cross-sectional view of a propulsion system 60 made in accordance with the teachings of the present disclosure. With continuing reference to FIGS. 1-7, propulsion system 60 is substantially identical to prior art propulsion system 20 with the primary exception being that propulsion system 60 includes a plurality of vortex generators 62 disposed circumferentially about an inner surface of splitter 30. It should be understood that FIG. 8 presents a schematic representation and, accordingly, the depiction of each vortex generator has been simplified for ease of illustration. By positioning plurality of vortex generators 62 on the internal surface of splitter 30, each vortex generator 62 has greater access to the high velocity air of primary airflow 45 than do plurality of vortex generators 52 because the thickness of the boundary layer that forms on the internal surface of splitter 30 is relatively small as compared with boundary layer 38. Accordingly, if vortex generators are positioned on the internal surface of splitter 30 (or on the internal surface of nacelle 26 in propulsion systems that do not employ a splitter), such vortex generators may be smaller than vortex generators positioned on center body 22 while still achieving substantially the same benefit.

With continuing reference to FIGS. 1-7, in the embodiment illustrated in FIG. 8, each vortex generator of the plurality of vortex generators 62 will encounter the high velocity air of primary airflow 45 and will generate a plurality of vortices 64 that will propagate through diffuser region 46. As plurality of vortices 64 propagate, they will generate up-wash 56 and downwash 58 that will move the high velocity air of primary airflow 45 radially towards center body 22 and will also move the low velocity air of primary airflow 45 (i.e., the air in boundary layer 38) radially away from center body 22. As discussed above with respect to vortex generators 52, this movement of the high and low velocity air of primary airflow 45 will cause the high and low velocity air to mix and intermingle. This, in turn, reduces the disparity of the stagnation pressure at different radial locations throughout primary airflow 45 and lowers the overall radial distortion of primary airflow 45 before it reaches face 48 of engine 32. Thus, as a result of the agitation of primary airflow 45 by plurality of vortex generators 62, the stagnation pressure of the portion of primary airflow 45 entering engine core 34 will be higher than it would have been had plurality of vortex generators 62 not been present.

Figure 9:
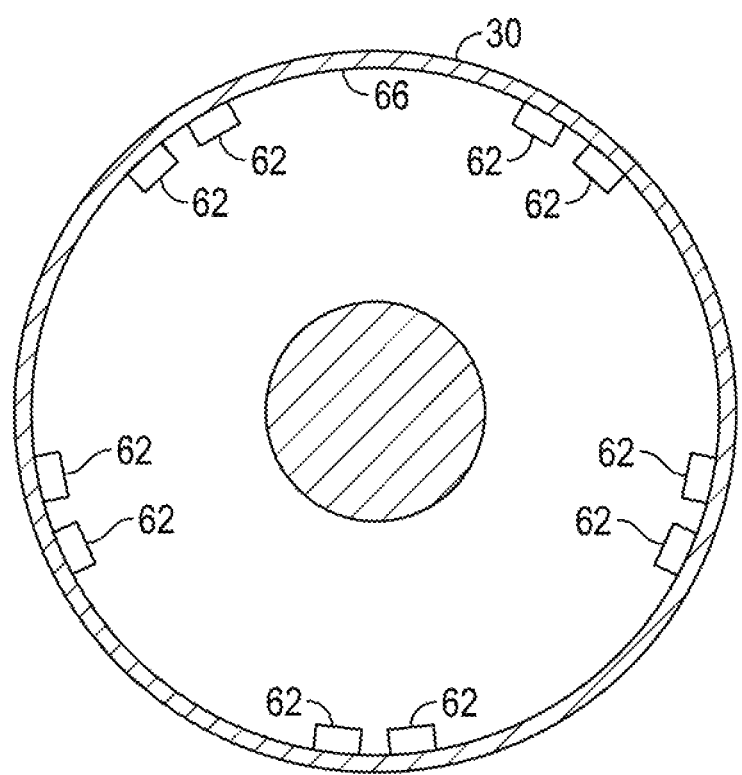
FIG. 9 is a cross-sectional view taken across the line 9-9 of FIG. 8.

FIG. 9 is a cross-sectional view taken along the line 9-9 of FIG. 8. Plurality of vortex generators 62 are arranged circumferentially in pairs about an inner surface 66 of splitter 30. With continuing reference to FIGS. 1-8, each pair of vortex generators is oriented at a predetermined angle of attack α with respect to primary airflow 45. In some embodiments, each pair of vortex generators may be positioned and aligned at substantially the same axial location along inner surface 66. In other embodiments, the axial position of each pair of vortex generators may be varied. In the illustrated embodiment, each vortex generator 62 of each pair of vortex generators has a rectangular configuration. It should be understood that this is merely exemplary in nature, in other embodiments, plurality of vortex generators 62 may have any suitable shape, contour, aspect ratio or configuration without departing from the teachings of the present disclosure.

Figure 10:
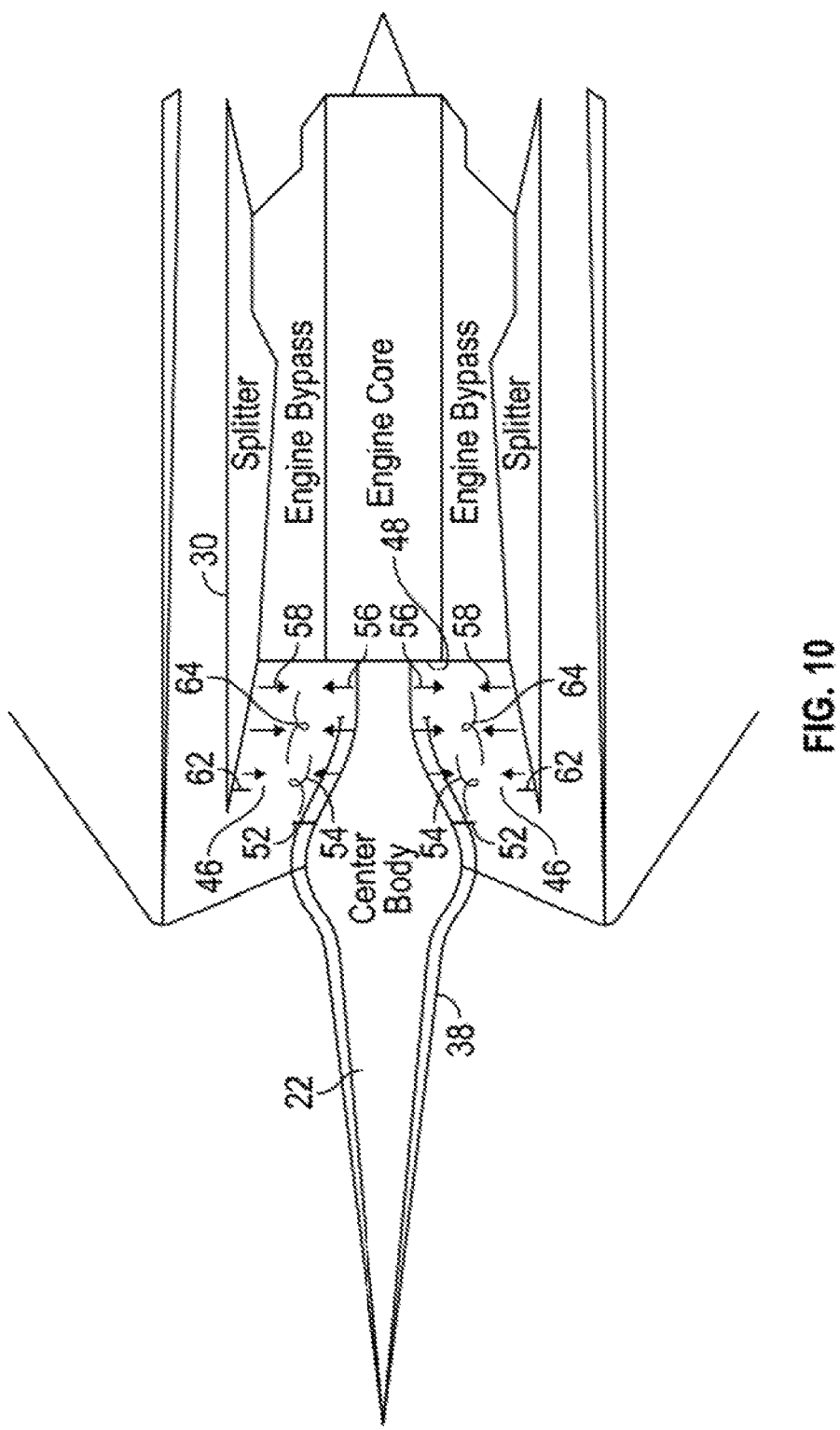
FIG. 10 is a schematic cross-sectional view illustrating yet another non-limiting embodiment of a propulsion system made in accordance with the teachings of the present disclosure.

FIG. 10 is a schematic cross sectional view of a propulsion system 70 made in accordance with the teachings of the present disclosure. With continuing reference to FIGS. 1-9, propulsion system 70 is substantially identical to prior art propulsion system 20 with the primary exception being that propulsion system 70 includes a plurality of vortex generators 52 disposed circumferentially about center body 22 and another plurality of vortex generators 62 disposed circumferentially about an inner surface of splitter 30. It should be understood that FIG. 10 presents a schematic representation and, accordingly, the depiction of each vortex generator has been simplified for ease of illustration. By positioning plurality of vortex generators 52 circumferentially about center body 22 and also positioning plurality of vortex generators 62 circumferentially on the internal surface of splitter 30, the two sets of vortex generators can cooperate to create a flow that is stronger, that has mutually reinforcing up-wash and downwash, and that leads to stronger radial gradients and more complete flow redistribution and mixing (both radially and circumferentially) than would be possible using only a single set of vortex generators at only one of the two locations. This enhanced flow more effectively causes the mixing and intermingling of the fast moving portions and the slow moving portions of primary airflow 45, and thereby yields a flow that is even more homogenous when it reaches face 48 of engine 32 than would be produced by either set of vortex generators acting alone.

Each vortex generator of plurality of vortex generators 52 will encounter the high velocity air of primary airflow 45 and will generate a plurality of vortices 54 that will propagate downstream through diffuser region 46. Each vortex generator of the plurality of vortex generators 62 will also encounter the high velocity air of primary airflow 45 and will generate a plurality of vortices 64 that will propagate downstream through diffuser region 46. As plurality of vortices 54 and 64 propagate, they will generate up-wash 56 and downwash 58 that will move the high velocity air of primary airflow 45 radially towards center body 22 and will also move the low velocity air of primary airflow 45 (i.e., the air in boundary layer 38) radially away from center body 22. This movement of the high and low velocity air of primary airflow 45 will cause the high and low velocity air to mix and intermingle. This, in turn, reduces the disparity of the stagnation pressure at different radial locations throughout primary airflow 45 and lowers the overall radial distortion of primary airflow 45 before it reaches face 48 of engine 32. Thus, as a result of the agitation of primary airflow 45 by plurality of vortex generators 62, the stagnation pressure of the portion of primary airflow 45 entering engine core 34 will be higher than it would have been without plurality of vortex generators 62.

Figure 11:
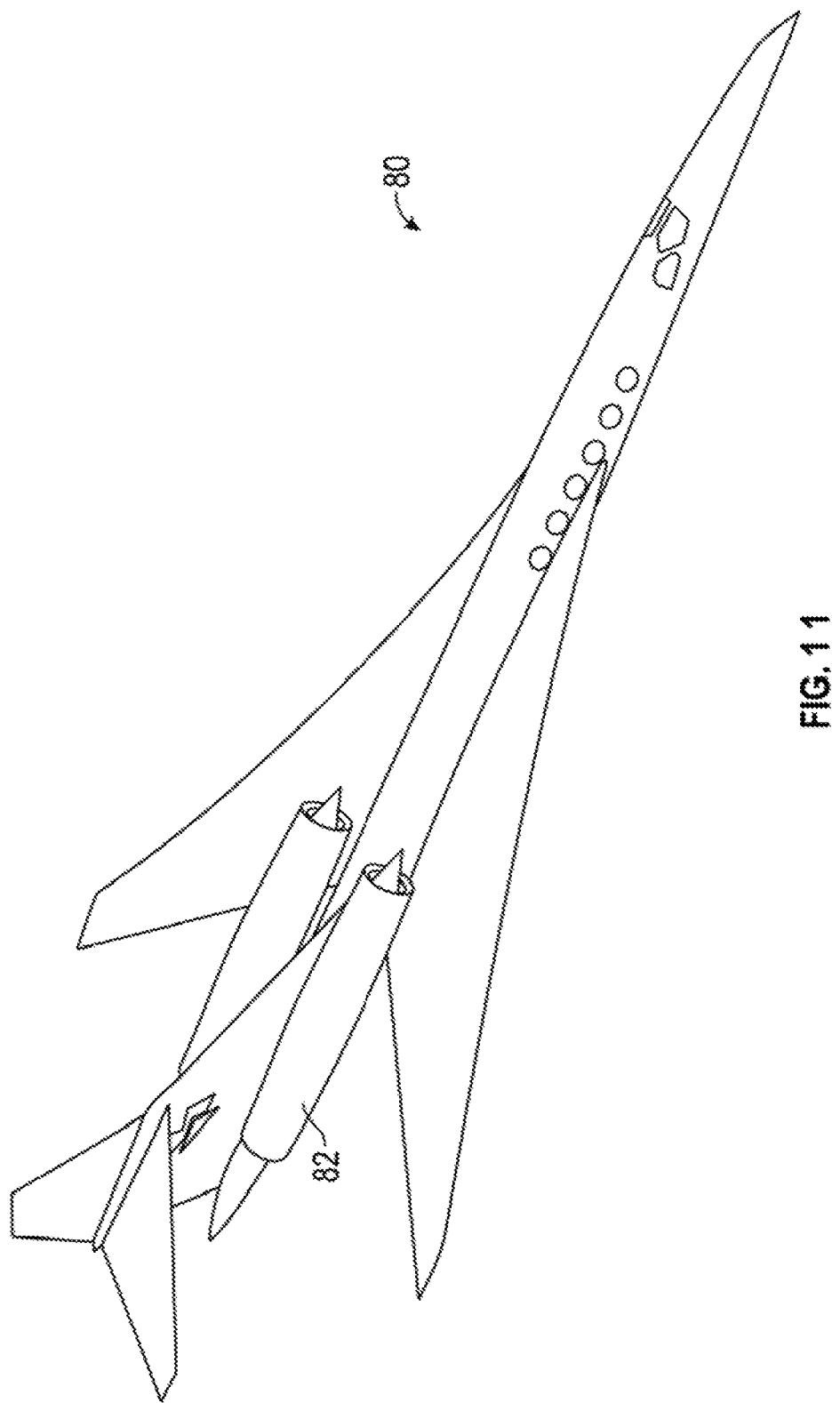
FIG. 11 is a perspective view illustrating a non-limiting embodiment of a supersonic aircraft equipped with a propulsion system made in accordance with the teachings of the present disclosure.

FIG. 11 is a perspective view illustrating a non-limiting embodiment of a supersonic aircraft 80. Supersonic aircraft 80 includes a propulsion system 82. Propulsion system 82 includes an engine, a center body disposed upstream of the engine, a shroud partially surrounding the engine and the center body, the shroud configured to direct an airflow passing over the center body towards the engine and a plurality of vortex generators positioned upstream of the engine. The plurality of vortex generators each have a height such that when supersonic aircraft 80 is flown at a predetermined speed, the plurality of vortex generators create a plurality of vortices that propagate at least partially outside of a boundary layer that is formed proximate the center body. The plurality of vortices cause a high-velocity portion of the airflow to move radially towards the center body and a low-velocity portion of the airflow to move radially away from the center body prior to the airflow reaching the AIP.

With continuing reference to FIGS. 1-10, in some non-limiting embodiments, propulsion system 82 may be substantially identical to propulsion system 50. In other non-limiting embodiments, propulsion system 82 may be substantially identical to propulsion system 60. In still other non-limiting embodiments, propulsion system 82 may be substantially identical to propulsion system 70. While supersonic aircraft 80 is depicted as a fixed wing aircraft, it should be understood that aircraft having any suitable configuration may also be employed without departing from the teachings of the present disclosure. Similarly, although supersonic aircraft 80 has been illustrated with two nacelles 82 attached to a vertical stabilizer, it should be understood that any suitable number of nacelles 80 may be employed and further, that they may be housed at any suitable location on the aircraft.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It should be understood that various changes may be made in the function and arrangement of elements described in an exemplary embodiment without departing from the scope of the disclosure as set forth in the appended claims.

What is claimed is:

1. An arrangement for use with a propulsion system for a supersonic aircraft, the arrangement comprising:
    a center body configured for coupling to an inlet and to support a boundary layer formed when the supersonic aircraft is flown at a predetermined altitude and a predetermined speed greater than Mach 1;
    a first vortex generator disposed on the center body, the first vortex generator extending a first height above the center body; and
    a second vortex generator disposed on the center body, said second vortex generator extending a second height above the center body, the second height being greater than the first height,
    wherein said first height and said second height are greater than approximately seventy-five percent of a thickness of the boundary layer proximate a location of the first vortex generator and the second vortex generator, respectively, when the aircraft is flown at the predetermined altitude and the predetermined speed.

2. The arrangement of claim 1, wherein one of the first height and the second height are greater than 100% of the thickness of the boundary layer.

3. The arrangement of claim 1, wherein one of the first height and the second height are greater than one hundred and twenty percent of the thickness of the boundary layer.

4. The arrangement of claim 1, wherein the first height and the second height are greater than one hundred and twenty-five percent of the thickness of the boundary layer.

5. The arrangement of claim 1, wherein the first vortex generator and the second vortex generator are disposed circumferentially about the center body.

6. The arrangement of claim 1, wherein the second vortex generator forms a first generator pair with the first vortex generator.

7. The arrangement of claim 1, wherein the first vortex generator has a substantially rectangular shape.

8. The arrangement of claim 1, wherein the first vortex generator has an aspect ratio of approximately 2.

9. A propulsion system for a supersonic aircraft, the propulsion system comprising:
    a plurality of vortex generators positioned upstream of an engine of the propulsion system, each vortex generator of the plurality of vortex generators having a height such that when the supersonic aircraft is flown at a predetermined altitude and at a predetermined cruise speed, the predetermined cruise speed being greater than Mach 1, the plurality of vortex generators create a plurality of vortices that propagate at least partially outside of a boundary layer formed proximate a surface of a supersonic inlet, the plurality of vortices causing a high-velocity portion of the airflow to move towards the engine core and a low-velocity portion of the airflow to move towards the engine bypass prior to the airflow reaching a face of the engine, the plurality of vortex generators being disposed aft of a terminal shock formed when the supersonic aircraft is flown at the predetermined cruise speed, and each vortex generator of the plurality of vortex generators having a height greater than a thickness of the boundary layer at the location of each vortex generator of the plurality of vortex generators.

10. The propulsion system of claim 9, wherein the height of each vortex generator of the plurality of vortex generators does not exceed one hundred and twenty-five percent of the thickness of the boundary layer at the location of each vortex generator of the plurality of vortex generators.

11. The propulsion system of claim 9, wherein the plurality of vortex generators are arranged circumferentially about the surface of the supersonic inlet.

12. The propulsion system of claim 9, wherein the plurality of vortex generators are arranged circumferentially about an inner surface of a shroud of the propulsion system.

13. The propulsion system of claim 9, wherein the plurality of vortex generators are arranged circumferentially about both the surface of the supersonic inlet and an inner surface of a shroud of the propulsion system.

14. The propulsion system of claim 9, wherein the plurality of vortex generators are arranged in pairs of vortex generators.

15. The propulsion system of claim 14, wherein each vortex generator of each pair of vortex generators is oriented with respect to the airflow so as to have an angle of attack.

16. The propulsion system of claim 15, wherein the angle of attack is between sixteen degrees and twenty-four degrees.

17. The propulsion system of claim 15, wherein each vortex generator of each pair of vortex generators is oriented at opposite angles of attack to each other.

18. The propulsion system of claim 9, wherein the plurality of vortex generators are arranged such that the vortices generate both an up-wash and a downwash.

19. The propulsion system of claim 9, wherein the predetermined altitude comprises a predetermined cruise altitude.

20. A propulsion system for a supersonic aircraft, the propulsion system comprising:
    a plurality of vortex generators positioned upstream of an engine of the propulsion system, each vortex generator of the plurality of vortex generators having a height such that when the supersonic aircraft is flown at a predetermined altitude and at a predetermined cruise speed, the predetermined cruise speed being greater than Mach 1, the plurality of vortex generators create a plurality of vortices that propagate at least partially outside of a boundary layer formed proximate a surface of a supersonic inlet, the plurality of vortices causing a high-velocity portion of the airflow to move towards the surface and a low-velocity portion of the airflow to move away from the surface prior to the airflow reaching a face of the engine, the plurality of vortex generators being disposed aft of a terminal shock formed when the supersonic aircraft is flown at the predetermined cruise speed, and each vortex generator of the plurality of vortex generators having a height greater than a thickness of the boundary layer at the location of each vortex generator of the plurality of vortex generators.

* * * * *